Dec. 23, 1952   R. G. McPHAIL   2,623,160
DIRECT LIGHTING LUMINAIRE AND/OR REFRACTOR FOR USE THEREIN
Filed April 23, 1949   2 SHEETS—SHEET 1
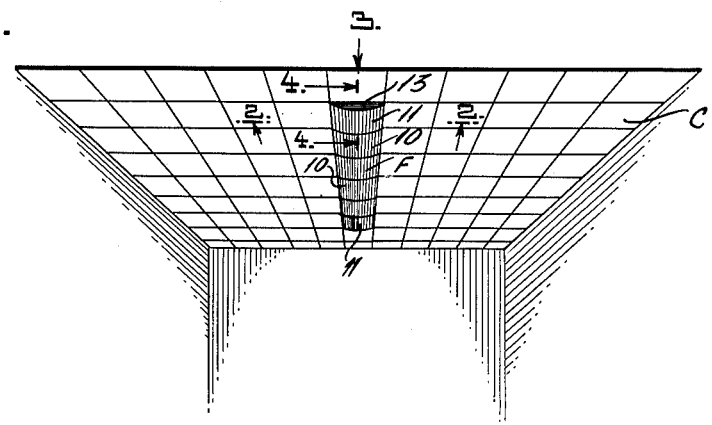
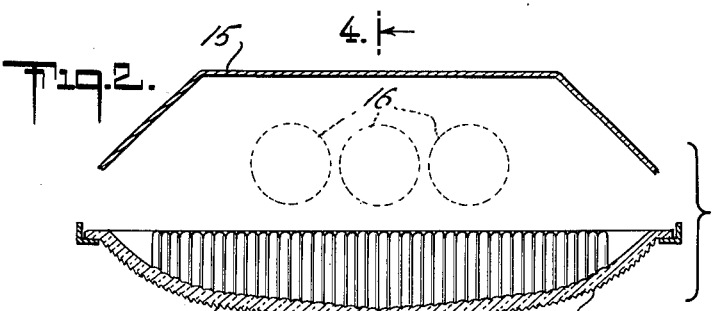
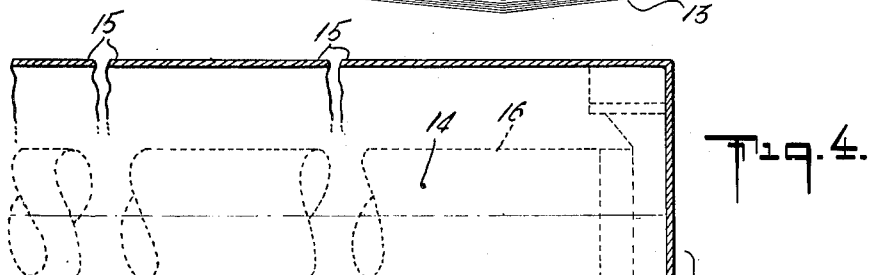
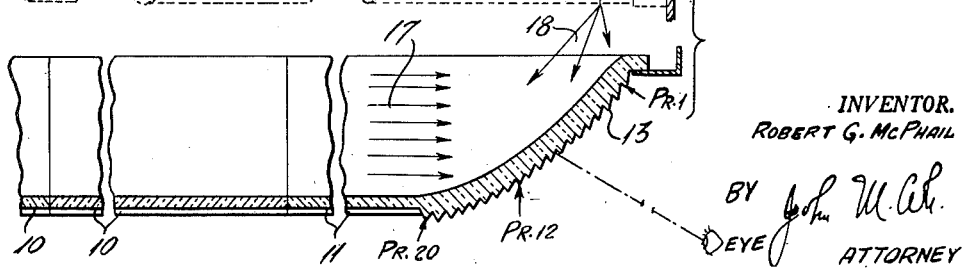
INVENTOR.
ROBERT G. McPHAIL
BY
EYE   ATTORNEY

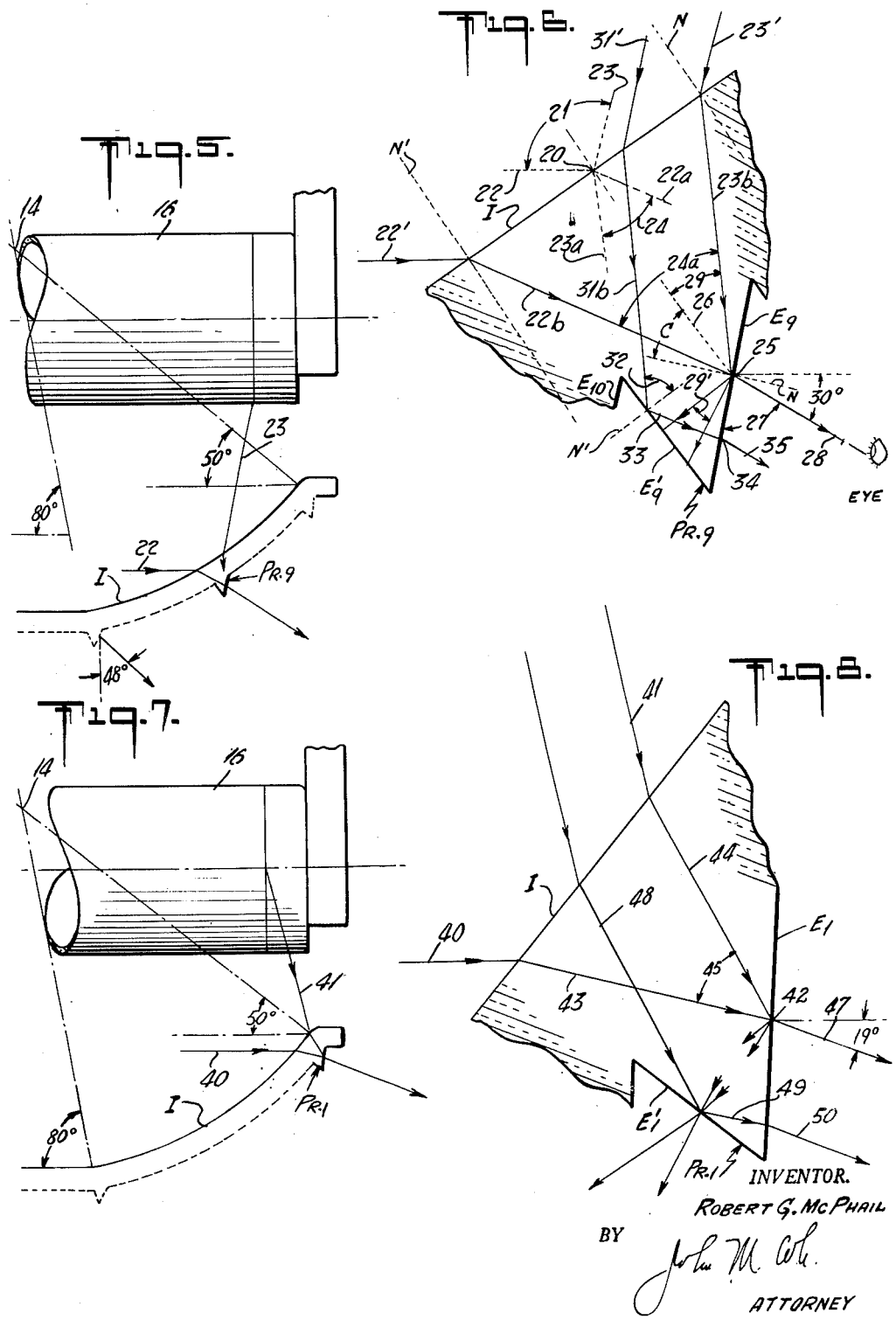

Patented Dec. 23, 1952

2,623,160

UNITED STATES PATENT OFFICE 2,623,160

DIRECT LIGHTING LUMINAIRE AND/OR REFRACTOR FOR USE THEREIN

Robert G. McPhail, Newark, Ohio, assignor to Holophane Company, Inc., New York, N. Y., a corporation of Delaware Application April 23, 1949, Serial No. 89,350

8 Claims. (Cl. 240—93)

The present invention relates to luminaires and is more particularly directed toward direct lighting luminaires of the tubular lamp type adapted for recessed mounting overhead and having transversely dished light transmitting prismatic covers.

Direct fluorescent lighting luminaires when viewed end on by an observer at ordinary angles of observation present an elongated source of brightness and when the end of the luminaire is not opaque or completely shielded, such end, if in the field of view, tends to present a comparatively small region of high brightness in contrast with the surrounding ceiling area. This end portion has a substantial projected area in such direction of view and as it is adapted to receive light from the entire length of the fluorescent source and reflector, its brightness is likely to be about the same as that of the bare lamps, and hence objectionable, unless reduced in some manner. Efforts have heretofore been made to reduce this brightness by diffusion of the light but without achieving satisfactory results. The diffusion in lateral planes does not substantially affect the vertical distribution of light, and owing to the horizontal and nearly horizontal rays in the luminaire falling on such end there is a tendency to build up light in regions toward the ceiling, thereby causing no material diminution in brightness in the direction of observation.

The present invention contemplates the provision of luminaires employing such long overhead light sources with light transmitters having substantial depth at their ends and wherein the light transmitters are provided with prismatic light deflecting means which serve to lower light, which can be transmitted, into angles sufficiently below the horizontal as to substantially reduce the brightness in regions in the upper glare zone.

According to the present invention the light transmitters are in the form of prismatic plates with dished ends having transverse prismatic ribs disposed so as to refract useful light into regions below the glare angle and reflect all other light into directions such that it is not emitted in the general direction of the observer looking at the end of the fixture at the usual angles of observation.

Other and further objects will appear as the description proceeds.

The accompanying drawings show, for purposes of illustrating the present invention, an embodiment in which the invention may take form, it being understood that the drawings are illustrative of the invention rather than limiting the same.

In the drawings:

Figure 1 is a perspective view showing an installation of fluorescent lighting equipment in the ceiling;

Figure 2 is a transverse sectional view on the line 2—2 of Figure 1 illustrating a luminaire;

Figure 3 is an end view of the light transmitting plate and taken in the direction of the arrow 3 of Figure 1;

Figure 4 is a vertical sectional view taken on the line 4—4 of Figures 1 and 2;

Figure 5 is an enlarged diagrammatic view showing the end portions of the lamp and refractor and light control by a prism at the end of the refractor and intermediate the uppermost and lowermost prism.

Figure 6 is an enlarged sectional view showing in detail the light control in the region of the prism shown in Figure 5; and Figures 7 and 8 are views similar to Figures 5 and 6 showing light control at the uppermost prism.

In the drawings a ceiling of usual construction is indicated at C and an elongated fluorescent fixture at F. The entire length of the fixture except at its ends has dished plates 10, 10 with longitudinal prisms. At the ends it is provided with lens plates 11 with longitudinal prisms such as indicated at 12. (The longitudinal prisms of plates 10 are similar.) The end plates 11 have curved prism carrying end portions 13, which rise to the level of the ceiling. Plates for these fixtures are typically made to fit in openings one foot wide and each plate (10 or 11) is one foot long. The plates may be dished approximately 1½ inches, the curved end portions being about 2 inches long, the location of the center curvature being indicated at 14, above the center line of the lamp 16 and to the left of the prisms on 13. The body of the fixture is diagrammatically indicated at 15. Such fixtures may have one lamp or a plurality of lamps and may be of considerable length without any transverse screens in them so that light reaches an end portion 13 of the fixture throughout a very wide vertical angle, extending substantially to the horizontal for light coming from the remote end of the fixture and with considerable divergence, especially at the top. Inasmuch as the lamps and reflectors form a source of brightness extending the entire width of the fixture, the end 13 of the light transmitting closure receives over its entire width and depth light in vertical sectors extending from the horizontal up into regions about the zenith.

In Figure 4, the bundle of horizontal rays approaching the end 13 of the plate is indicated by horizontal arrows 17, the limiting rays from the extreme end of the lamp toward the end portion of the closure plate are indicated by the bundle of rays 18. If the rays 17 were to proceed through a light transmitting medium without deviation or through a diffusing transmitting medium, they do tend to provide illumination at angles at least up to the horizontal and above and below it, if vertical diffusion took place, so that one would see the lamps, or the end of the light transmitting cover would become objectionably bright.

The present invention is directed toward the control of these horizontally travelling light rays so that they are not emitted at angles above the glare zone and at the same time the present invention provides means to so control the downwardly emitted rays from the end portions of the lamps so that they are deviated into directions in the region of the nadir or on the other side of the nadir from the observer so as to cause no objectionable brightness in the viewing direction.

In the present case the light control is effected, in a manner to be fully explained below, by a series of small transverse prisms, twenty of which may occupy the curved end of a plate of the dimensions above given. These are numbered Pr. 1–20, inclusive.

A point such as point 20 opposite Pr. 9 of Figures 5 and 6 can receive light in a vertical longitudinal sector 21 between the horizontal ray 22 and the downwardly sloping ray 23 from the end of the lamp. In this region the vertical sector of rays is somewhat more than 90° in extent. The incident surface I of the end portion of the refractor condenses this sector of light into a narrower sector 24 defined by the limiting rays 22a, 23a. A point such as 25 on the emitting surface $E_9$ opposite the point 20 can receive light in a sector 24a corresponding with sector 24, the limiting rays 22b and 23b being parallel with rays 22a, 23a and corresponding with rays 22' and 23' in air parallel with rays 22 and 23, respectively. The emitting surface $E_9$ is out of parallelism with the incident surface I in a direction to form a prism adapted to deviate light downwardly. It is placed so that part of the impinging bundle of rays in sector 24a will be transmitted and part will be reflected internally. The normal to the surface $E_9$ is indicated at N and the line 26 is drawn at the critical angle $c$ from the normal N. Light rays in the sector 24a and also within the critical angle $c$ will be refractively transmitted by the surface $E_9$ and emitted in a sector 27 so that the bounding ray 28 in air is below the horizontal. If the overall deviating power of the surfaces I and $E_9$ for horizontal ray 22 is properly selected, the ray 28 may be placed at an angle to be below the glare zone, i. e., at an angle of approximately 30° below the horizontal. Thus, all light falling on the point 25 above the ray 22' and up to substantially the normal ray on the surface $E_9$ will be emitted in directions below the glare angle. Light received at the point 25 in the sector 29 between the line 26 N and the ray 23b will be totally reflected by the surface $E_9$ and proceed in a radiating bundle of rays indicated by the sector 29' toward an intermediate light emitting surface $E_9'$ interconnecting the emergent surfaces $E_9$, $E_{10}$ of adjacent prisms Pr. 9 and Pr. 10. The light in sector 29' will fall on the surface $E_9'$ in directions for transmission toward the left of Figure 6 and away from the observer, as will be obvious.

Inasmuch as the surface $E_9'$ interconnects two surfaces $E_9$, $E_{10}$, this surface receives rays such as 31b parallel with ray 23b and corresponding with incident rays 31' parallel with 23'. These rays 31b have angles of incidence 32 greater than the critical angle at the surface $E_9'$ and are totally reflected as indicated at 33, so as to fall on the emergent surface $E_9$ at 34 for refractive transmission. These surfaces therefore form a catadioptric prism. In order that the emergent ray 35 will be no higher than the ray 28, the ray 33 should be no lower in angle than the ray 22b. The slope of the surface $E_9'$ is therefore made such that the limiting ray 31', after refraction on the first surface and total reflection on the second surface, will be refracted at the third surface $E_9$ into directions no higher than the screening angle of the ray 28. Rays with angles of incidence greater than angle 32 are reflected and refracted below rays 33, 34. The action shown in Figures 5 and 6 is that which takes place in the profile plane longitudinal of the fixture.

The upper prism Pr. 1 at the end of the refractor near the flange is illustrated in Figures 7 and 8. This prism has an emergent surface $E_1$ which must slope inwardly a sufficient amount to provide draft to free the pressed glass or plastic from the mold. The incident surface I opposite the uppermost prism receives a converging sector of light between rays 40 and 41 as indicated. A point 42 on the emergent surface $E_1$ receives light in a sector having bounding rays 43 and 44 corresponding with incident rays 40 and 41, respectively. The sector of light 45 between the rays 43 and 44 is handled by the emergent surface $E_1$ in generally the same way as above described, the light being emitted below the horizontal. The totally reflected light is directed by surface $E_1$ to the intermediate surface $E_1'$ for transmission thereby. The intermediate surface $E_1'$ also receives light rays such as 48 parallel with rays 44 and reflects them as indicated at 49 parallel with ray 43 so that the emergent surface $E_1$ bends it downwardly into parallelism with the ray 47 as indicated at 50. To provide draft this surface should be about 3° from the vertical.

The coordination of action of dioptric and catadioptric prisms is not feasible in the upper regions to secure as great a screening angle as can be had lower down. The upper prism such as Pr. 1 in the regions stated, is capable of screening off light above about 71° from the nadir.

In the construction such as above described, the angles of incidence for horizontal rays increase from a minimum angle of about 50° opposite the upper prism Pr. 1 to an angle of about 80° opposite the bottom prism Pr. 20. The overall deviation for horizontal rays in the median vertical plane of the end of the plate as of uniform sign (i. e. not ±) increases preferably at a uniform rate from about 19° at the upper prism to about 42° at the lower prism so that the brightness is lowered toward nadir.

The transverse prismatic ribs cover the entire width of the ends of the plate as indicated in Figure 3. As the plate is deepest at the center, these prismatic ribs have slight downward slope toward the center line of the plate. These transverse ribs are adapted to receive the broad band of light tending to escape from the end of the fixture below the ceiling line at angles which might create glare and, as above described, are on all of these rays so as to either bend them down below the glare zone or reflect them back away from the observer so that the brightness of the end of the luminaire viewed in such directions is greatly reduced.

Inasmuch as fluorescent luminaires with prismatic covers are designed to collect the light from the lamps and place it on work areas generally under the luminaire, the brightnesses in the direction of the work area are necessarily high. Outside such directions, the brightnesses fall off with increase in angle from the nadir. This takes place across the axis of the fixture as well as diagonal to the fixture and lengthwise of the fixture so far as the bottom is concerned. In a fixture with three lamps, brightnesses of the order of five candle power per brightest square inch of projected area may be present at a vertical angle of 0°. Approximately the same brightness may be maintained out to say 30° from the nadir whether across the fixture, along it or diagonal of it. With dished plates, the brightness falls to about half this value at angles of 60° from the nadir and then drops off to about ¼ of the brightness at angles of 65° from the nadir.

Using end plate prisms of the type shown herein, brightness of the end of the luminaire when viewed lengthwise of the fixture at various vertical angles follows somewhat the same pattern but is substantially less at angles greater than 60° from the nadir. In angles of more than 65° from the nadir, the brightness is approximately 20% of the maximum brightness of the bottom of the fixture. This indicates clearly the very substantial screening action obtained by the prisms employed. While one is actually looking in the direction of the long row of lamps, the brightness is reduced to a very low figure. This is in great contrast with what would occur if light depressing means were not provided, for in that case the brightness would be of the order of five candle power per square inch.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. In a luminaire having a plurality of parallel rectilinear light sources side by side, a downwardly acting reflecting trough about the sources having a mouth with parallel sides spaced wider than the sources and a transverse end at the end of the sources, and a trough shaped light refracting closure for the reflector mouth, the closure at its end having an upwardly and outwardly sloping end wall under the end portions of the sources which end wall receives downward light from the end portions of the sources and slanting light from the more remote portions of the sources all the way down to the horizontal, the improvement which comprises a system of substantially horizontal transverse prismatic ribs on the lower surface of said end wall for reducing the brightness of the exterior surface of said closure end at high angles below the horizontal, the ribs having upwardly and forwardly sloping surfaces facing outwardly and connecting upwardly and rearwardly sloping surfaces facing inwardly, the outwardly facing rib surfaces with the opposed upper or incident surface forming a series of refracting prisms of downwardly increasing refracting power for horizontal incident light to bend it downwardly and limit the vertical angle of emergent, twice-refracted light to controlled angles below the horizontal, and also to reflect light falling thereon at angles in excess of the critical angle toward the connecting surfaces for transmission thereby, said connecting surfaces being so sloped as to reflect once refracted light falling thereon toward the first rib surfaces at angles no higher in the refracting medium than the angle of the refracted horizontal rays.

2. The improvement of claim 1, according to which the refracting power of the prisms for horizontal incident light ranges from substantially 19° at the upper prism to substantially 42° at the lower prism.

3. A refractor having an inwardly concave incident surface and adapted to receive a bundle of parallel light rays in the profile plane throughout angles of incidence ranging from about 50° to about 80° whereby the parallel rays upon entry into the refractor are variably deviated in the same general direction, the refractor having external regressed prisms with principal surfaces sloped relative to the opposed incident surface to further deviate the emitted corresponding rays in the same general direction, the refracting power of said two surfaces increasing from prism to prism in the same direction as the increase in angle of incidence of said parallel rays, the prisms also having interconnecting secondary surfaces eclipsing portions of the principal surfaces with respect to certain of the parallel rays, said secondary surfaces making such angles with the incident surface and the principal emergent surfaces eclipsed thereby as to form catadioptric prisms of deviating power to accept rays at substantially 90° to the parallel rays in the said profile and emit them substantially parallel with the first mentioned emitted rays.

4. A refractor for deviating a bundle of horizontal parallel light rays into a bundle of generally parallel downwardly sloping light rays, said refractor having an upper profile in the form of an upwardly concave arc with its lowermost portion nearly horizontal and of vertical depth to intercept the rays whereby the rays upon entry into the refractor are bent downwardly in varying amounts, the lower surface of the refractor being in the form of prismatic ribs with active surfaces disposed at variant angles to the opposed upper surface such that the total deviating power of the two surfaces is of uniform sign to depress emitted light.

5. A refractor such as claimed in claim 4, wherein the radius of curvature of the upper surface is such as to reduce the angle of incidence from 80° at the bottom to about 50° at the top and the slopes of the active surfaces increase progressively from a minimum of about 3° to the vertical.

6. A refractor having in a vertical plane an upwardly concave light incident surface with its lowermost portion substantially horizontal so as to intercept a sector of downwardly emitted light occupying in excess of 90° above the horizontal, whereby said light is condensed on entry into the refractor into a narrower sector, the refractor having opposed ribs each with a first surface located to totally reflect a part of the refracted light falling thereon and to refractively transmit another portion at angles below a predetermined angle below the horizontal and with a second surface connecting the first surface of one rib with the first surface of the other rib and so located that its normal makes equal angles with the refracted limiting rays of the incident light.

7. Means of accepting a vertical sector of light rays extending from the horizontal to regions about zenith and transmitting them downwardly on both sides of the nadir and for screening light throughout a substantially angular region below the horizontal, comprising a series of transversely disposed prismatic elements having incident and emitting surfaces for bending horizontal rays in said sector to keep them below said screening angle and intermediate reflecting surfaces facing both the incident and emitting surfaces at angles to reflect toward the latter or emitting surface light falling thereon from the first and originating in said vertical sector and at angles no higher than the refracted ray corresponding with the horizontal ray in the vertical sector.

8. A luminaire comprising a horizontal light source of indeterminate length and adapted to be viewed from below in the general direction of its length and a refractor having a dished end portion of substantial depth below the near end of the source extending transversely of the source and facing the remote end of the source so as to intercept at all points therein light in a vertical sector extending from the horizontal to regions about the zenith, the outer or lower surface of the refractor having a series of transversely extending prismatic ribs each having a near face and remote face, the near fact of each rib being tilted to the upper incident surface at an angle to refractively transmit a portion of the light falling thereon and at angles below the horizontal in excess of substantially 20° and to totally reflect the remainder of the light toward the remote surface for refractive transmission thereby, each remote surface being tilted at an angle so as to internally reflect once refracted light incident thereon toward the near surface and in directions no higher than the once refracted horizontal direct light falling on said near surface whereby the latter light is transmitted by said near surface into the same region below the horizontal.

ROBERT G. McPHAIL.

REFERENCES CITED

The following references are of record in the file of this patent:

UNITED STATES PATENTS

| Number | Name | Date |
| --- | --- | --- |
| 1,674,165 | Dorey | June 19, 1928 |
| 2,232,276 | Schepmoes | Feb. 18, 1941 |
| 2,269,554 | Rolph | Jan. 13, 1942 |
| 2,280,160 | Rolph et al. | Apr. 21, 1942 |
| 2,318,715 | Rolph | May 11, 1943 |
| 2,474,317 | McPhail | June 28, 1949 |

FOREIGN PATENTS

| Number | Country | Date |
| --- | --- | --- |
| 460,989 | Germany | June 9, 1928 |

OTHER REFERENCES

Holophane Catalog No. F. L. 1–5–41–1941. Page 12 relied on.